United States Patent
Wang

(10) Patent No.: US 7,791,653 B2
(45) Date of Patent: Sep. 7, 2010

(54) METHOD OF READING OUT DIGITAL IMAGES AND RELATED DEVICE

(75) Inventor: Chun-Chang Wang, Hsinchu (TW)

(73) Assignee: Altek Corporation, Hsinchu (TW)

( * ) Notice: Subject to any disclaimer, the term of this patent is extended or adjusted under 35 U.S.C. 154(b) by 827 days.

(21) Appl. No.: 11/691,074

(22) Filed: Mar. 26, 2007

(65) Prior Publication Data

US 2008/0129850 A1   Jun. 5, 2008

(30) Foreign Application Priority Data

Nov. 30, 2006  (TW) ............................... 95144555 A

(51) Int. Cl.
*H04N 5/217*  (2006.01)
*H04N 3/14*  (2006.01)
*H04N 5/335*  (2006.01)

(52) U.S. Cl. .................. 348/241; 348/294; 348/312
(58) Field of Classification Search ............... 348/241, 348/314–317, 222.1–261, 294–324
See application file for complete search history.

(56) References Cited

U.S. PATENT DOCUMENTS

| 6,442,206 | B1 * | 8/2002 | Hrusecky ............... 375/240.21 |
| 6,546,156 | B1 * | 4/2003 | Kanzaki et al. ............. 382/298 |
| 7,015,965 | B2 * | 3/2006 | Asada et al. ................ 348/312 |
| 7,545,427 | B2 * | 6/2009 | Tokunaga ................... 348/312 |

* cited by examiner

*Primary Examiner*—Jason Chan
*Assistant Examiner*—Pritham Prabhakher
(74) *Attorney, Agent, or Firm*—Alan Kamrath; Kamrath & Associates PA

(57) ABSTRACT

A method of reading out images is used for a digital image capturing device. The method includes the following steps: obtaining a first frame with a digital image capturing module; activating a pre-control signal with a processor when the first frame needs to be expanded; activating a control signal with a timing generator when the expansion of the first frame has finished to execute a first frame expanding process; and clearing the pre-control signal and the control signal when the expansion of the first frame procedure has finished.

10 Claims, 3 Drawing Sheets

US 7,791,653 B2

METHOD OF READING OUT DIGITAL IMAGES AND RELATED DEVICE

BACKGROUND OF THE INVENTION

1. Field of the Invention

The present invention relates to a method of reading out images and a related device and, more particularly, to a method of reading out digital images with a dynamic extendable frame.

2. Description of the Related Art

In today's technology, digital image capturing devices are extremely popular devices, and users are demanding increasingly better performance from digital image capturing devices. In general, when using the digital image capturing device, the processor sometimes requires a period of time to perform an operation (such as switching between modes). For both digital cameras and digital video cameras, the digital image sensor (such as a CCD) continuously downloads images. The sensor itself cannot extend the captured frame until the processor finishes the current operation or procedure.

In order to extend frames, one prior art technology utilizes a method of defining a V-blanking phase having a fixed period of time. However, since each V-blanking phase has a fixed period of time, it cannot be dynamically adjusted. When the image capturing device is switched between different modes, the processor requires a different processing time for the switching procedure. In order to make the V-blanking phase suitable for different conditions, the V-blanking phase needs to be defined as the maximum value of the different processing times for different conditions. Therefore, the V-blanking phase is always larger than the processing time under all conditions, which causes unnecessary delays for the user. If the V-blanking phase is shorter than the operational processing time of the processor, the data for the next frame may be missing, which can cause the digital image capturing device to crash.

In another prior art technology, the timing generator is turned off when the processor is operating, or the timing generator is switched into an idle phase until the image processing procedure has finished. When the timing generator is turned off, the photo diodes of the digital image capturing device still continuously accumulate dark current, which can lead to increasing noise in the frames.

Therefore, it is desirable to provide a method of reading out digital images with a dynamic extendable frame, which can also eliminate noise to mitigate and/or obviate the aforementioned problems.

SUMMARY OF THE INVENTION

A main objective of the present invention is to provide a method of reading out digital images with a dynamic extendable frame.

Another objective of the present invention is to provide a method of reading out digital images with a dynamic extendable frame which can also eliminate noise.

Another objective of the present invention is to provide a digital image capturing device with a dynamic extendable frame and with noise elimination capability.

In order to achieve the above-mentioned objective, the digital image capturing device comprises a processor, a timing generator, and a digital image capturing device. All elements are electrically connected to each other. The processor is used for controlling the timing generator to conduct the method of reading out images according to the present invention. The method comprises the following steps: obtaining a first frame by a digital image capturing module; activating a pre-control signal by a processor when the first frame is needed to be expanded; activating a control signal by a timing generator when the expansion of the first frame is finished for executing a first frame expanding process; and clearing the pre-control signal and the control signal when the expansion of the first frame procedure is finished.

In order to eliminate noise caused of dark current, a first frame noise eliminating procedure is performed while the first frame extension process is performed. The first frame noise eliminating procedure is stopped while the first frame extension process is stopped. The first frame noise eliminating procedure is performed by a readout timing method or a sweep timing method.

Other objectives, advantages, and novel features of the invention will become more apparent from the following detailed description when taken in conjunction with the accompanying drawings.

DETAILED DESCRIPTION OF THE PREFERRED EMBODIMENT

Figure 1:
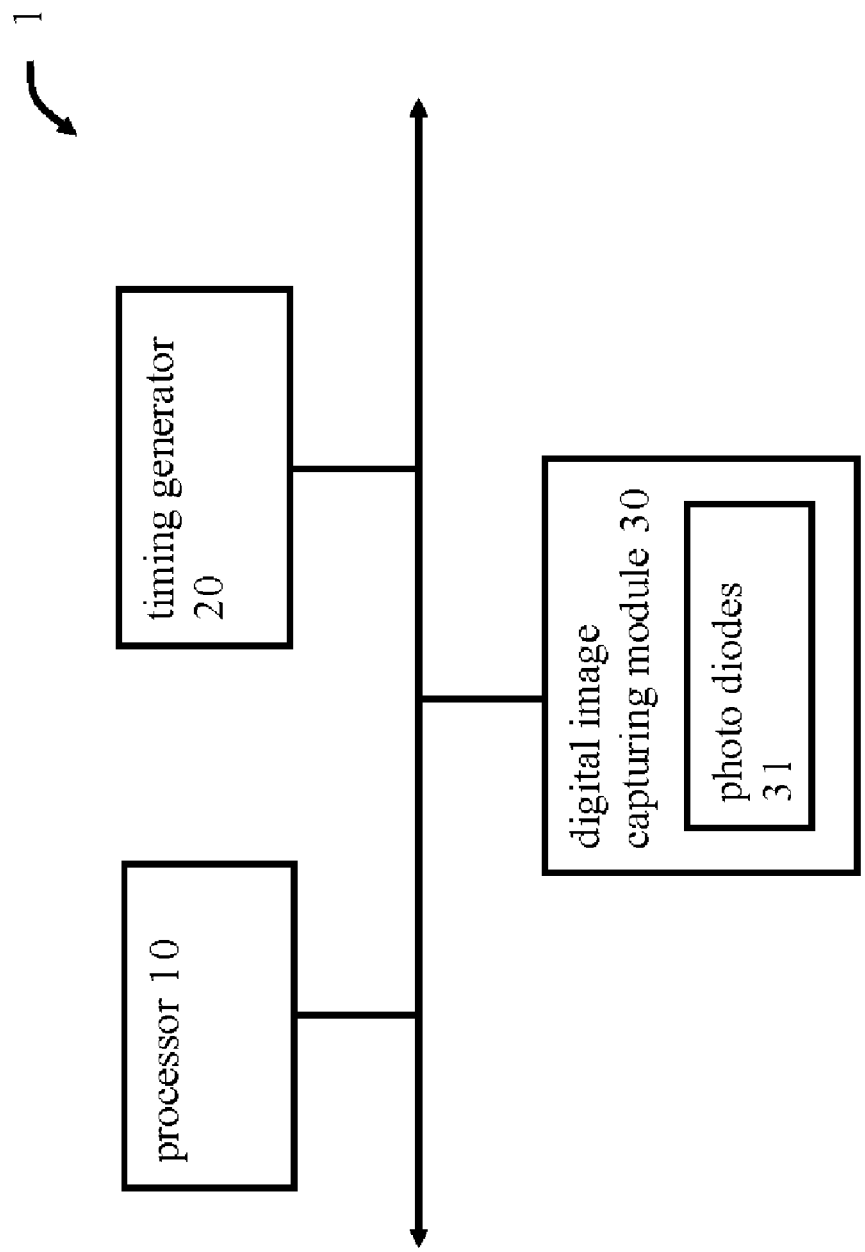
FIG. 1 is a hardware structural drawing of a digital image capturing device according to the present invention.

Please refer to FIG. 1. FIG. 1 is a hardware structural drawing of a digital image capturing device 1 according to the present invention. The digital image capturing device 1 may be a digital camera, a digital video camera or other equivalent device. The digital image capturing device 1 comprises a processor 10, a timing generator 20, and a digital image capturing module 30. All elements are electrically connected to each other. The processor 10 is used to perform the various procedures executed in the digital image capturing device 10. The digital image capturing module 30 may include CCD elements or CMOS elements for capturing images. In this embodiment, CCD elements are utilized. The image capturing module 30 comprises a plurality of photo diodes 31 for performing an exposure procedure. The timing generator 20 is used for controlling the digital image capturing module 30 to perform a first frame extension process 40 (please refer to FIG. 3). Generally, the first frame extension process 40 comprises: a first frame extraction 41, a first frame extension 42 and a second frame extraction 43. Each process is controlled by the timing generator 20.

Figure 2:
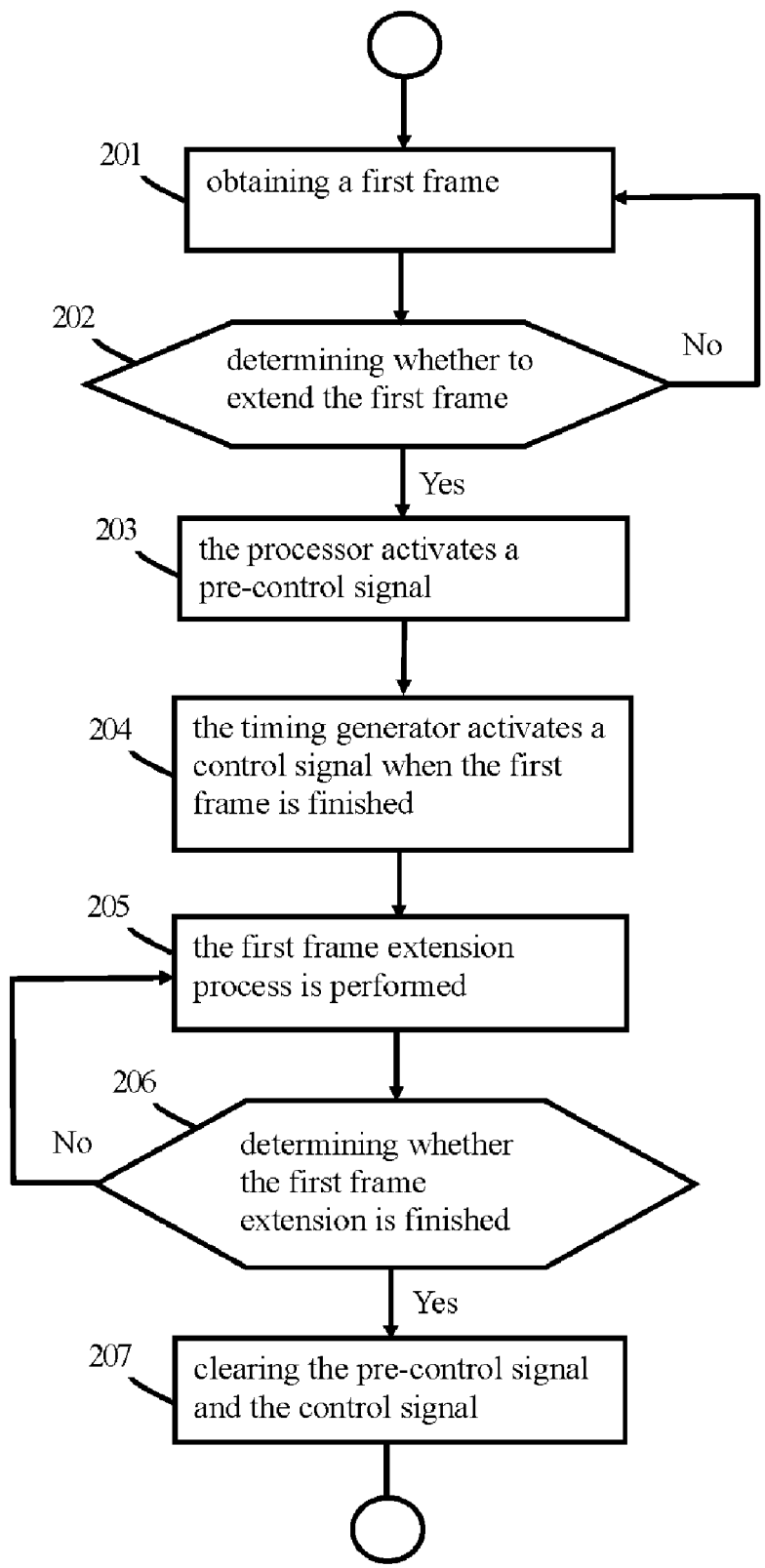
FIG. 2 is a flowchart of a method of reading out digital images from a digital image capturing device according to the present invention.
Figure 3:
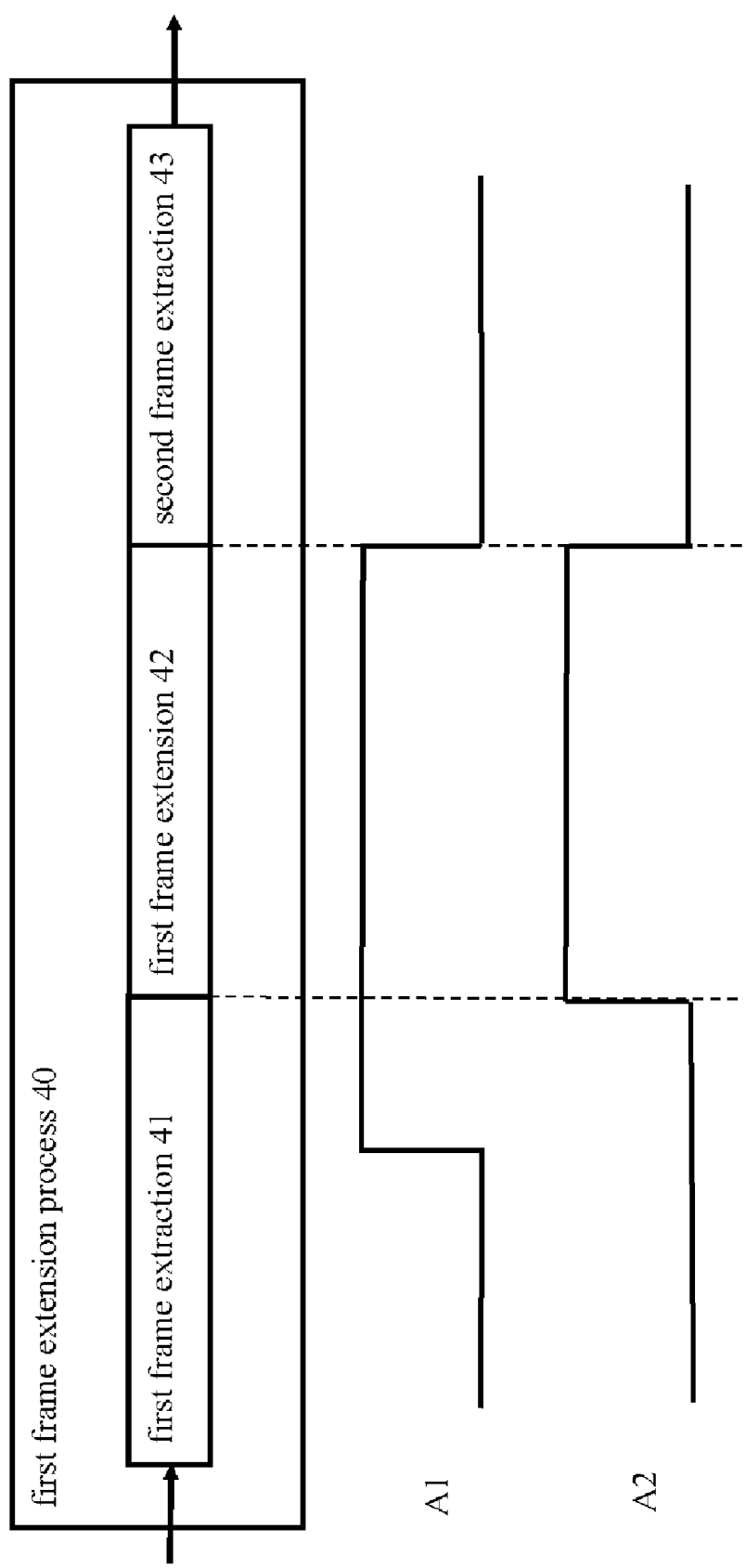
FIG. 3 is a schematic drawing of an embodiment of a first frame extension according to the present invention.

Please refer to FIG. 1 to FIG. 3. FIG. 2 is a flowchart of a method of reading out digital images from a digital image capturing device 1 according to the present invention. FIG. 3 is a schematic drawing of an embodiment of a first frame extension 42 according to the present invention. When the digital image capturing device 1 is to perform an image extension read procedure, the processor 10 controls the timing generator 20 to perform the following steps:

Step 201: obtaining a first frame.

The digital image capturing module 30 is used to obtain the first frame. While reading the first frame, the digital image capturing module 30 sequentially obtains images.

Step 202: determining whether to extend the first frame.

When a user is operating the digital image capturing device 1, the processor 10 automatically determines whether to extend the first frame. The digital image capturing device 1 has many different operating modes. For example, the digital image capturing device 1 has a monitor mode (also called a preview mode), a VGA mode, an FR mode (also called a still mode), etc. The monitor mode has the lowest resolution with a faster downloading speed, which is suitable for LCD previewing purposes. The VGA mode has an average resolution with a slower downloading speed, which is suitable for video recording purposes. The FR mode has the highest resolution with the slowest downloading speed, which is suitable for photography.

For example, when the user switches the digital image capturing device 1 from the monitor mode to the FR mode, the processor 10 needs time to perform the operation. Therefore, the picture for the FR mode cannot be displayed immediately. While the processor 10 begins to execute the operation, it also gives a first frame extension command.

If the first frame extension 42 is not necessary, then the procedure for obtaining the unfinished first frame is continued. (step 201).

Step 203: the processor 10 activates a pre-control signal A1.

Since it is a certainty that the first frame extension 42 will be necessary, the processor 10 of the digital image capturing device 1 activates a pre-control signal A1 (with reference to FIG. 3) to control the timing generator 20. The processor 10 activates the pre-control signal A1 during the first frame extraction 41 of the first frame extension process 40, and not when the first frame extraction 41 has completed.

The timing generator 20 has a built-in counter. Taking the VGA mode as an example, if a frame has 480 lines, when the value read by the counter is equal to the last line of the first frame, this indicates that the first frame extraction 41 has completed. Please refer to FIG. 3. When the first frame extraction 41 of the first frame extension process 40 has finished, the timing generator 20 checks whether the pre-control signal A1 is activated. If the pre-control signal A1 is activated, the timing generator 20 immediately activates the control signal A2 when the first frame extraction 41 has finished to control the digital image capturing module 30 and execute the first frame extension process 40.

Step 205: the first frame extension process 40 is performed.

The processor 10 gives the first frame extension command and extends time by reading dummy lines, which can be dynamically adjusted according to the actual processing time of the processor 10.

During the first frame extension 42, increasing dark currents may cause accumulated noise. To eliminate this noise, a first frame noise eliminating procedure can be performed while the first frame extension 42 is performed.

The first frame noise eliminating procedure utilizes the characteristics of the CCD and is performed by a readout timing method or a sweep timing method. The difference between these two methods is that the readout timing method removes noise from one line at a time, whereas the sweep timing method may remove noise from 10~15 lines at a time. This is because of different timing waveforms. Since the sweep timing method has shorter timing waveforms, one line typically has 10~15 stages, which means 10~15 lines can be cleaned at once. Therefore, the sweep timing method is more efficient for the noise removal process.

The first frame extension 42 and the first frame noise eliminating procedure are performed simultaneously, and they both start and end at the same time. In the other words, when the first frame extension 42 is performed, the first frame noise eliminating procedure may also be performed. When the first frame extension 42 stops, the first frame noise eliminating procedure may also be stopped.

Sometimes, the noise eliminating procedure may not be necessary. For example, when switching between different modes, the current first frame may no longer be used. Therefore, the noise on the first frame can be ignored, and the first frame is simply extended to smoothly continue to the next mode. Only when the first frame is again required does the noise eliminating procedure become desirable. A charge transformation procedure is performed when the first frame extension process 40 is performed.

Step 206: determining whether the first frame extension 42 is finished.

If the processor 10 is still operating, then this indicates that the first frame extension process 40 is not finished and remains to perform the first frame extension process 40 (step 205). If the processor 10 completes its operation, the first frame extension process 40 can be completed.

Step 207: clearing the pre-control signal A1 and the control signal A2.

When the first frame extension 42 is known to be finished, the processor 10 immediately clears the pre-control signal A1 and the control signal A2 and ends the first frame extension 42.

For the first frame extension 42 shown in FIG. 3, after step 207, the digital image capturing module 30 performs the second frame extraction 43. The second frame is immediately subsequent to the first frame, and no gap exists between the first frame and the second frame.

Alternatively, after step 207, the digital image capturing device 1 is switched to another operating mode. For example, it may be switched from the monitor mode to the VGA mode, and there will be no second frame.

Although the present invention has been explained in relation to its preferred embodiment, it is to be understood that many other possible modifications and variations can be made without departing from the spirit and scope of the invention as hereinafter claimed.

What is claimed is:

1. A method of reading out digital images from a digital image capturing device, the digital image capturing device comprising a processor, a timing generator and a digital image capturing module; the method comprising:

(A) obtaining a first frame by the digital image capturing module;

(B) activating a pre-control signal by the processor when the first frame needs to be extended;

(C) activating a control signal by the timing generator when the first frame is finished to execute a first frame extension process, wherein when the first frame extension process is performed, a first frame noise eliminating procedure is performed; and (D) clearing the pre-control signal and the control signal when the first frame extension process is finished, wherein when the first frame extension process is finished, the first frame noise eliminating procedure is stopped.

2. The method as claimed in claim 1, further comprising:

(E) obtaining a second frame by the digital image capturing module.

3. The method as claimed in claim 1, wherein the first frame noise eliminating procedure uses a readout timing method.

4. The method as claimed in claim 1, wherein the first frame noise eliminating procedure uses a sweep timing method.

5. The method as claimed in claim 1, wherein the digital image capturing device is a digital camera or a digital video camera.

6. A digital image capturing device comprising:
   a processor;
   a digital image capturing module electrically connected to the processor; and
   a timing generator electrically connected to the processor and the digital image capturing module, wherein the processor controlling the timing generator achieves:
   (A) obtaining a first frame by the digital image capturing module;
   (B) activating a pre-control signal by the processor when the first frame needs to be extended;
   (C) activating a control signal by the timing generator when the first frame is finished to execute a first frame extension process, wherein when the first frame extension process is performed, a first frame noise eliminating procedure is performed; and
   (D) clearing the pre-control signal and the control signal when the first frame extension process is finished, wherein when the first frame extension process is finished, the first frame noise eliminating procedure is stopped.

7. The device as claimed in claim 6, wherein the processor further achieves:
   (E) obtaining a second frame by the digital image capturing module.

8. The device as claimed in claim 6, wherein the first frame noise eliminating procedure uses a readout timing method.

9. The device as claimed in claim 6, wherein the first frame noise eliminating procedure uses a sweep timing method.

10. The device as claimed in claim 6, wherein the digital image capturing device is a digital camera or a digital video camera.

* * * * *